United States Patent

Thau et al.

(10) Patent No.: US 9,322,427 B2
(45) Date of Patent: Apr. 26, 2016

(54) FASTENING DEVICE

(75) Inventors: Sebastian Thau, Feldkirch (AT); Daniel Baudy, Feldkirch (AT)

(73) Assignee: Hilti Aktiengesellschaft, Schaan (LI)

( * ) Notice: Subject to any disclaimer, the term of this patent is extended or adjusted under 35 U.S.C. 154(b) by 61 days.

(21) Appl. No.: 13/135,165

(22) Filed: Jun. 28, 2011

(65) Prior Publication Data

US 2012/0027538 A1 Feb. 2, 2012

(30) Foreign Application Priority Data

Jul. 30, 2010 (DE) .................. 10 2010 038 728

(51) Int. Cl.
*F16B 43/00* (2006.01)
*F16B 35/06* (2006.01)

(52) U.S. Cl.
CPC ............... *F16B 43/001* (2013.01); *F16B 35/06* (2013.01)

(58) Field of Classification Search
USPC ................. 411/371.1, 369, 542, 915
See application file for complete search history.

(56) References Cited

U.S. PATENT DOCUMENTS

| 436,775 | A | * | 9/1890 | Corley | 411/371.1 |
|---|---|---|---|---|---|
| 951,437 | A | * | 3/1910 | Gehrke | 220/304 |
| 2,761,347 | A | | 9/1956 | McKee | 85/1 |
| 2,982,573 | A | * | 5/1961 | McKee, Jr. | 411/542 |
| 3,153,971 | A | * | 10/1964 | Lovisek | 411/371.1 |
| 3,160,054 | A | * | 12/1964 | Cohen et al. | 411/371.1 |
| 3,247,752 | A | * | 4/1966 | Greenleaf et al. | 411/542 |
| 3,452,636 | A | * | 7/1969 | Cohen et al. | 411/371.1 |
| 3,500,712 | A | * | 3/1970 | Wagner | 411/371.1 |
| 3,661,046 | A | * | 5/1972 | Waud et al. | 411/369 |
| 3,670,618 | A | * | 6/1972 | Jellison | 411/371.1 |
| 3,882,752 | A | * | 5/1975 | Gutshall | 411/371.1 |
| 3,897,712 | A | * | 8/1975 | Black | 411/373 |
| 4,292,876 | A | * | 10/1981 | De Graan | 411/542 |
| 4,712,802 | A | * | 12/1987 | Hewison et al. | 411/542 |
| 4,749,321 | A | * | 6/1988 | Knohl et al. | 411/371.1 |
| 4,875,818 | A | * | 10/1989 | Reinwall | 411/369 |
| 5,156,509 | A | * | 10/1992 | Wu | 411/369 |
| 5,281,065 | A | * | 1/1994 | Wu | 411/258 |
| 5,846,040 | A | | 12/1998 | Ueno | 411/45 |
| 6,241,444 | B1 | * | 6/2001 | Clarke | 411/369 |
| 6,854,942 | B1 | * | 2/2005 | Hargis | 411/369 |
| 7,329,077 | B2 | * | 2/2008 | Curtis | 411/371.1 |
| 8,029,223 | B2 | * | 10/2011 | Mair | 411/542 |
| 2010/0047033 | A1 | | 2/2010 | Baumgartner et al. | 411/84 |

FOREIGN PATENT DOCUMENTS

| AU | 503037 | 8/1979 |
|---|---|---|
| DE | 14 02 035 U | 3/1937 |
| DE | 9201686 U1 | 4/1992 |
| DE | 4304289 | 8/1993 |
| DE | 42 23 780 C2 | 1/1994 |
| DE | 196 32 956 A1 | 2/1998 |
| DE | 297 20 094 U1 | 3/1999 |
| DE | 29720094 | 3/1999 |
| DE | 10 2008 041 411 A1 | 6/2010 |
| EP | 0 557 688 A1 | 9/1993 |
| EP | 2 157 324 A2 | 2/2010 |

(Continued)

*Primary Examiner* — Flemming Saether
(74) *Attorney, Agent, or Firm* — Davidson, Davidson & Kappel, LLC

(57) ABSTRACT

A fastening device comprising a head, an elongated shaft and a seal. The seal has a sealing element and a covering elements made of different materials.

7 Claims, 3 Drawing Sheets

(56) References Cited

FOREIGN PATENT DOCUMENTS

| | | |
|---|---|---|
| FR | 23 25 844 A1 | 4/1977 |
| GB | 1509858 | 5/1978 |
| GB | 22 64 151 A | 8/1993 |
| GB | 2264151 | 8/1993 |
| WO | WO0005509 | 2/2000 |
| WO | WO03078853 | 9/2003 |

* cited by examiner

FASTENING DEVICE

This claims the benefit of German Patent Application DE 10 2010 038 728.2, filed Jul. 30, 2010 and hereby incorporated by reference herein.

The invention relates to a device for fastening a first object to a second object.

BACKGROUND

Such fastening devices often have a head, an elongated shaft and a sealing means. The shaft serves to penetrate into the first and/or second object, whereby the sealing means is meant to prevent external media, for instance, moisture, from penetrating along the shaft. Usually, the sealing element has a first sealing surface to create a seal vis-à-vis the first object as well as a second sealing surface to create a seal vis-à-vis the shaft. However, there is always the risk of leaks, particularly when the shaft penetrates the first and/or the second object at an oblique angle.

SUMMARY OF THE INVENTION

It is an objective of the invention to provide a fastening device with which the risk of such leaks is reduced.

The present invention provides a device for fastening a first object to a second object, comprising a head, whereby the head has a counter-bearing to support the first object, an elongated shaft, whereby the lengthwise direction of the shaft defines an axis, and a sealing means or seal, whereby the sealing means has a first sealing surface to create a seal vis-à-vis the first object as well as a second sealing surface to create a seal vis-à-vis the counter-bearing, whereby the sealing means has a sealing element and a cover element arranged in the axial direction between the sealing element and the head, whereby the sealing element is made of a first material and the cover element is made of a second material that differs from the first material.

A preferred embodiment is characterized in that the first and the second sealing surfaces are oriented crosswise, especially perpendicular, to the axis. When the supporting force between the counter-bearing and the first object, or at least a direction component of the support force, acts in the direction of the axis, the sealing surfaces are subjected to the supporting force or to its direction component towards the axis.

A preferred embodiment is characterized in that the second sealing surface is arranged directly across from the counter-bearing. Especially preferably, the second sealing surface touches the counter-bearing.

A preferred embodiment is characterized in that the first and/or the second sealing surfaces comprise an elastomer. Especially preferably, the first and/or the second sealing surfaces are made of an elastomer.

A preferred embodiment is characterized in that the sealing means, the sealing element and/or the covering element surround the shaft like a ring. Especially preferably, the sealing means, the sealing element and/or the covering element have an essentially circular inner and/or outer contour.

A preferred embodiment is characterized in that the covering element has a larger inner diameter and/or outer diameter than the sealing element does.

A preferred embodiment is characterized in that the sealing element has the first and the second sealing surfaces.

A preferred embodiment is characterized in that the counter-bearing has a contact surface for the covering element and a projection that especially preferably surrounds the axis, whereby the projection extends to the counter-bearing in the axial direction.

A preferred embodiment is characterized in that the sealing element has a contact surface for the covering element and a projection that especially preferably surrounds the axis, whereby the projection extends to the counter-bearing in the axial direction.

A preferred embodiment is characterized in that the covering element comprises a metal and/or an alloy. Especially preferably, the covering element is made of a metal and/or an alloy.

A preferred embodiment is characterized in that the outer diameter of the head is the same as or larger than that of the covering element and/or the sealing element.

A preferred embodiment is characterized in that the sealing element has the first sealing surface while the covering element has the second sealing surface. Especially preferably, the sealing element has a third sealing surface to create a seal vis-à-vis the covering element and/or the covering element has a fourth sealing surface to create a seal vis-à-vis the sealing element.

A preferred embodiment is characterized in that the covering element comprises an elastomer. Especially preferably, the covering element is made of an elastomer. Especially preferably, the elastomer has a lower elasticity than the material of the sealing element.

A preferred embodiment is characterized in that the covering element comprises a lubricant. Especially preferably, the covering element consists of a lubricant. The lubricant improves the sliding properties of the sealing means vis-à-vis an adjacent surface, for example, of the head or of the counter-bearing, and it is preferably an organic or inorganic lubricant, especially a wax and/or an oil.

A preferred embodiment is characterized in that the shaft has a force-transmission means for holding the second object.

A preferred embodiment is characterized in that the shaft has a first end and a second end, and in that the head is arranged on the first end, and/or the second end has a tip.

BRIEF DESCRIPTION OF THE DRAWINGS

The invention will be explained in greater detail below on the basis of embodiments making reference to the drawings. The following is shown.

DETAILED DESCRIPTION

Figure 1:
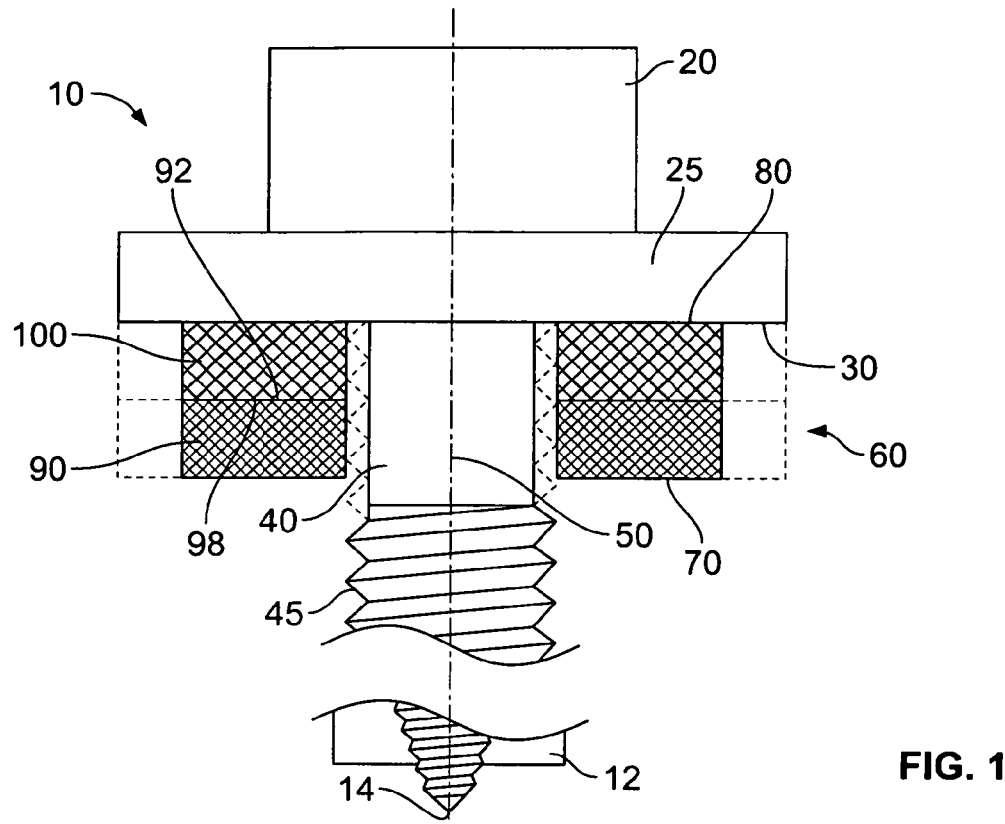
FIG. 1—a combined side and sectional view of a fastening device in several variants.

FIG. 1 shows a device 10 for fastening a first object to a second object, in a combined side and sectional view. The device 10 has a head 20 with a counter-bearing 30 that is configured as a contact surface and that serves to support the first object, and it has an elongated shaft 40. The head 20 is arranged at a first end of the shaft 40, whereby the shaft 40 has a tip 14 (shown schematically) at its second end. The lengthwise direction of the shaft defines an axis 50 with respect to which the counter-bearing 30 is oriented preferably perpendicular. Moreover, the shaft 40 has a force-transmission means or force transmitter 45 configured as a thread for purposes of transmitting a holding force from the device 10 to the second object 12 (shown schematically). Preferably, the device 10 is configured as a self-penetrating rotary fastening element. The head 20 and/or the shaft 40 are made of a metal, especially aluminum, or of an alloy, particularly high-grade steel or steel, preferably having an anticorrosion coating that especially contains zinc.

The device 10 has a sealing means or seal 60 having a first sealing surface 70 to create a seal vis-à-vis the first object, and a second sealing surface 80 to create a seal vis-à-vis the counter-bearing 30. Particularly in order to create a seal vis-à-vis the counter-bearing 30, the second sealing surface 80 is arranged directly across from the counter-bearing 30 and it touches the counter-bearing 30. The sealing means 60 here comprises a sealing element 90 and a covering element 100 arranged in the axial direction between the sealing element 90 and the head 20. The sealing element 90 and the covering element 100 have a preferably circular inner and outer contour, and they surround the shaft 40 like a ring.

The sealing element 90 has a third sealing surface 92 to create a seal vis-à-vis the covering element 100, while the covering element 100 has a fourth sealing surface 98 to create a seal vis-à-vis the sealing element 90. The third sealing surface 92 and the fourth sealing surface 98 are arranged across from each other and they touch each other. Preferably, the materials of the third sealing surface 92 and of the fourth sealing surface 98 are integrally bonded to each other, especially they are glued or welded together. In other embodiments, the third sealing surface and the fourth sealing surface are only loosely in contact with each other.

The sealing element 90, which especially comprises the first sealing surface 70, is made of a first material. The covering element 100, which especially comprises the second sealing surface 80, is made of a second material that differs from the first material. Preferably, the second material has a higher Shore hardness and thus a lower elasticity than the first material. In certain cases, the sealing element 90 is able to compensate for differences in the thickness of the first and/or second objects, so that the device 10 is optionally suitable for different applications. In certain cases, the covering element 100 is more resistant to shearing forces that occur between the covering element 100 and the head 20 when the device 10 is tightened.

The first material is preferably a first elastomer, especially preferably a first ethylene-propylene-diene monomer (EPDM) rubber and/or the second material is preferably a second elastomer, especially preferably a second EPDM.

The head 20 has an encircling projection 25 that has a larger outer diameter than the appertaining sealing element 90 and the covering element 100. The sealing element 90 has the same outer diameter as the covering element 100 does. As shown by the broken lines in FIG. 1, in modified embodiments, the sealing element 90 and/or the covering element 100 have the same outer diameter as the head 20 or its projection 25. The outer diameter of the sealing element 90 here or in other embodiments is especially smaller or larger than the outer diameter of the covering element 100. Moreover, the sealing element 90 has the same inner diameter as the covering element 100 does. In other embodiments, the inner diameter of the sealing element is smaller or larger than that of the inner diameter of the covering element.

The force-transmission means 45 is positioned at a distance from the sealing means 60 and especially from the first sealing surface 70 in the axial direction, namely, in the direction facing away from the head 20. Especially in the case of a plate-shaped first and/or second object, it is then possible in certain cases to clamp the first and/or second object between the force-transmission means 45 and the sealing means 60 so as to ensure a sufficient sealing force onto the first sealing surface 70. Furthermore this prevents overtightening of the device 10 in certain cases. As shown by broken lines in FIG. 1, the force-transmission means 45 in modified embodiments extends in the axial direction to the sealing means 60 or to the first sealing surface 70, or else all the way to the head 20.

Figure 2:
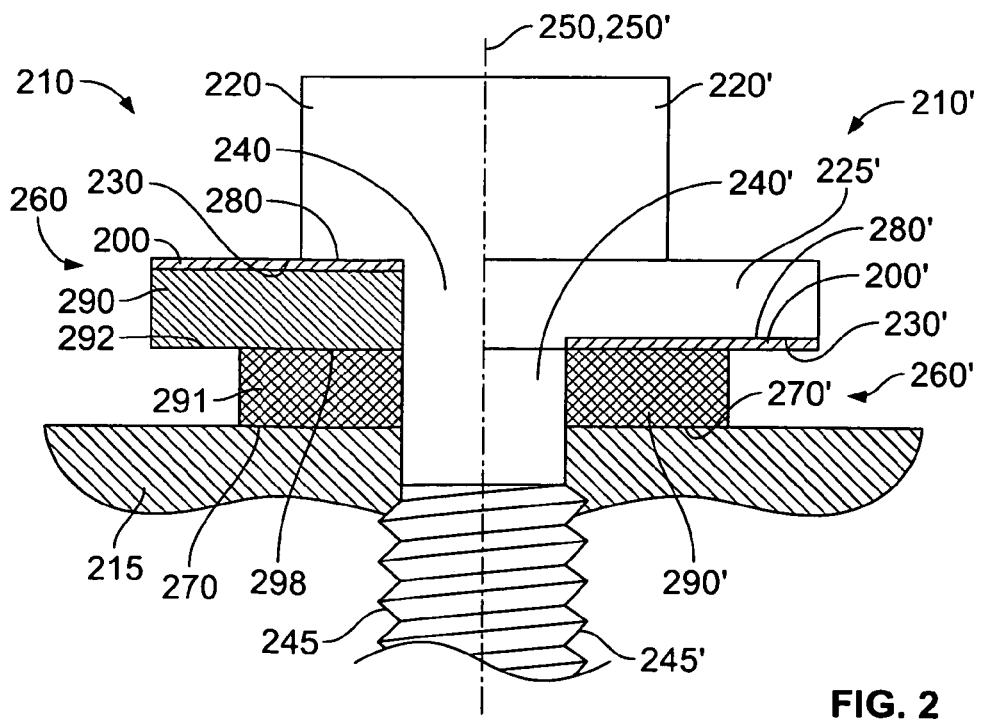
FIG. 2—a combined side and sectional view of a fastening device in several variants in the fastened state.

FIG. 2 shows a device 210 in the left-hand half of the drawing as well as a modified device 210' in the right-hand half of the drawing, each meant for fastening a first object 215 to a second object, in a combined side and sectional view.

The device 210 shown in the left-hand half of the drawing of FIG. 2 has a head 220 with a counter-bearing 230 configured as a contact surface for purposes of supporting the first object as well as an elongated shaft 240. The head 220 is arranged at a first end of the shaft 240, whereby the shaft 240 has a tip at its second end. The lengthwise direction of the shaft 240 defines an axis 250 that is oriented preferably perpendicular to the counter-bearing 230. Moreover, the shaft 240 has a force-transmission means 245 configured as a thread for purposes of transmitting a holding force from the device 210 to the second object. Preferably, the device 210 is configured as a self-penetrating rotary fastening element. The head 220 and/or the shaft 240 are made of a metal, especially aluminum, or of an alloy, particularly high-grade steel or steel, preferably having an anticorrosion coating that especially contains zinc.

The device 210 has a sealing means 260 having a first sealing surface 270 to create a seal vis-à-vis the first object 215, and a second sealing surface 280 to create a seal vis-à-vis the counter-bearing 230. Particularly in order to create a seal vis-à-vis the counter-bearing 230, the second sealing surface 80 is arranged directly across from the counter-bearing 230 and it touches the counter-bearing 230. The sealing means 260 here comprises a sealing element 290 and a covering element 200 arranged in the axial direction between the sealing element 290 and the head 220. The sealing element 290 has a preferably circular inner and outer contour and it surrounds the shaft 240 like a ring.

The sealing means also comprises another sealing element 291 that has a third sealing surface 292 to create a seal vis-à-vis the sealing element 290. The sealing element 290 has a fourth sealing surface 298 to create a seal vis-à-vis the other sealing element 291. The third sealing surface 292 and the fourth sealing surface 298 are arranged across from each other and they touch each other. Preferably, the materials of the third sealing surface 292 and of the fourth sealing surface 298 are integrally bonded to each other, especially they are glued or welded together. In other embodiments, the third sealing surface and the fourth sealing surface are only loosely in contact with each other.

The sealing element 290 is made of a first material. The covering element 200, which especially comprises the second sealing surface 280, is made of a second material that differs from the first material. Preferably, the second material comprises or consists of a lubricant such as, for example, a wax and/or an oil. In certain cases, the covering element reduces shearing forces that might occur between the covering element 200 and the head 220 when the device 210 is tightened.

In a preferred manner, before the sealing element 290 is mounted onto the shaft 240, the covering element 200 is applied onto the sealing element 290, preferably by means of spraying or immersion. In other embodiments, the covering element extends over the entire surface area of the sealing element, particularly over the inner surface arranged across from the shaft. The covering element 200 and the sealing element 290 have the same outer diameter, which is larger than the outer diameter of the head 220. In other embodiments, the outer diameter of the head is the same as or larger than the outer diameter of the covering element and/or of the sealing element.

The other sealing element is made of a third material. Preferably, the first material has a higher Shore hardness and thus a lower elasticity than the third material. In certain cases, the other sealing element 291 is able to compensate for differences in the thickness of the first and/or second objects, so that the device 210 is optionally suitable for different applications. In certain cases, the sealing element 290 is more resistant to shearing forces that occur between the sealing element 290 and the head 220 when the device 210 is tightened.

The first material is preferably a first elastomer, especially preferably a first EPDM and/or the third material is preferably a second elastomer, especially preferably a second EPDM. According to another embodiment, the first material is a metal, especially aluminum, or an alloy, particularly high-grade steel or steel, preferably having an anticorrosion coating that especially contains zinc.

The force-transmission means 245 is positioned at a distance from the sealing means 260 and especially from the first sealing surface 270 in the axial direction, namely, in the direction facing away from the head 220. In other embodiments, the force-transmission means extends in the axial direction to the sealing means or to the first sealing surface, or else all the way to the head.

The device 210' shown in the right-hand half of the drawing of FIG. 2 has a head 220' with a counter-bearing 230' configured as a contact surface for purposes of supporting the first object as well as an elongated shaft 240'. The head 220' is arranged at a first end of the shaft 240', whereby the shaft 240' has a tip at its second end. The lengthwise direction of the shaft defines an axis 250' that is oriented preferably perpendicular to the counter-bearing 230'. Moreover, the shaft 240' has a force-transmission means 245' configured as a thread for purposes of transmitting a holding force from the device 210' to the second object. Preferably, the device 210' is configured as a self-penetrating rotary fastening element. The head 220' and/or the shaft 240' are made of a metal, especially aluminum, or of an alloy, particularly high-grade steel or steel, preferably having an anticorrosion coating that especially contains zinc.

The device 210' has a sealing means 260' having a first sealing surface 270' to create a seal vis-à-vis the first object 215, and a second sealing surface 280' to create a seal vis-à-vis the counter-bearing 230'. Particularly in order to create a seal vis-à-vis the counter-bearing 230', the second sealing surface is arranged directly across from the counter-bearing 230' and it touches the counter-bearing 230'. The sealing means 260' here comprises a sealing element 290' and a covering element 200' arranged in the axial direction between the sealing element 290' and the head 220'. The sealing element 290' has a preferably circular inner and outer contour and it surrounds the shaft 240' like a ring.

The sealing element 290' is made of a first material. The first material is preferably an elastomer, especially preferably an EPDM. The covering element 200', which especially comprises the second sealing surface 280', is made of a second material that differs from the first material. Preferably, the second material comprises or consists of a lubricant such as, for example, a wax and/or an oil. In certain cases, the covering element reduces shearing forces that might occur between the covering element 200' and the head 220' when the device 210' is tightened.

The head 220' has an encircling projection 225' that has a larger outer diameter than the sealing element 290'. In other embodiments, the fastening device, in addition to or instead of the encircling projection 225', has a ring element that transmits axial forces from the head to the sealing means. The ring element is made of a metal, especially aluminum, or of an alloy, particularly high-grade steel or steel, preferably having an anticorrosion coating that especially contains zinc. The ring element here is preferably made of the same material as the head and/or the shaft.

In a preferred manner, before the sealing element 290' is mounted onto the shaft 240', the covering element 200' is applied onto the counter-bearing 230', preferably by means of spraying or immersion. In other embodiments, the covering element extends over the entire surface area of the head and of the shaft, particularly over the outer surface of the shaft arranged across from the sealing element and/or over the force-transmission means 245', or else over the entire surface area of the ring element. The projection 225' and the covering element 200' have the same outer diameter, which is larger than the outer diameter of the sealing element 290'. In other embodiments, the outer diameter of the sealing element is the same as or larger than the outer diameter of the covering element and/or of the counter-bearing.

The force-transmission means 245' is positioned at a distance from the sealing means 260' and especially from the first sealing surface 270' in the axial direction, namely, in the direction facing away from the head 220'. In other embodiments, the force-transmission means extends in the axial direction to the sealing means or to the first sealing surface, or else all the way to the head.

Figure 3:
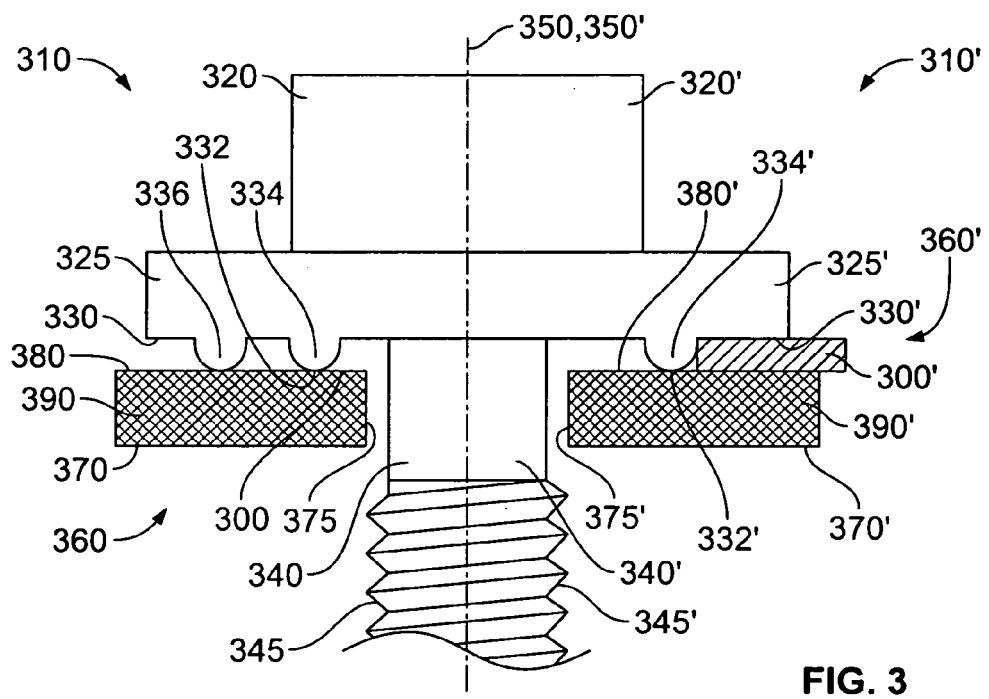
FIG. 3—a combined side and sectional view of a fastening device in several variants.

FIG. 3 shows a device 310 in the left-hand half of the drawing as well as a modified device 310' in the right-hand half of the drawing, each meant for fastening a first object to a second object, in a combined side and sectional view.

The device 310 shown in the left-hand half of the drawing of FIG. 3 has a head 320 with a counter-bearing 330 configured as a contact surface for purposes of supporting the first object as well as an elongated shaft 340. The head 320 is arranged at a first end of the shaft 340, whereby the shaft 340 has a tip at its second end. The lengthwise direction of the shaft defines an axis 350 that is oriented preferably perpendicular to the counter-bearing 330. Moreover, the shaft 340 has a force-transmission means 345 configured as a thread for purposes of transmitting a holding force from the device 310 to the second object. Preferably, the device 310 is configured as a self-penetrating rotary fastening element. The head 320 and/or the shaft 340 are made of a metal, especially aluminum, or of an alloy, particularly high-grade steel or steel, preferably having an anticorrosion coating that especially contains zinc.

The device 310 has a sealing means 360 having a first sealing surface 370 to create a seal vis-à-vis the first object, and a second sealing surface 380 to create a seal vis-à-vis the counter-bearing 330. The sealing means 360 here comprises a sealing element 390 and a covering element 300 arranged in the axial direction between the sealing element 390 and the head 320. The sealing element 390 and the covering element 300 have a preferably circular inner and outer contour, and they surround the shaft 340 like a ring.

The sealing element 390 is made of a first material. The first material is preferably an elastomer, especially preferably an EPDM. The covering element 300 is made of a second material that differs from the first material. Preferably, the second material comprises or consists of a lubricant such as, for example, a wax and/or an oil, which, in certain cases, reduces shearing forces that occur between the covering element 300 and the head 320 when the device 310 is tightened.

The counter-bearing 330 has a contact surface 332 for making contact with the covering element 300 as well as a first sealing projection 334 and a second sealing projection 336. Preferably, the sealing projections 334, 336 touch the second sealing surface 380 of the sealing element 300. The sealing projections 334, 336 especially preferably extend in the circumferential direction around the axis 350 and surround the axis 350 especially preferably as a closed ring, especially in the form of annular beads. In other embodiments, in contrast, one or more sealing projections are only formed in places. In other embodiments, the sealing element, and thus the covering element, in addition to or as an alternative to the sealing projection(s) of the counter-bearing, has one or more sealing projections that extend in the axial direction to the counter-bearing, especially to its sealing projection or sealing projections.

The sealing element 390 has the first sealing surface 370, while the covering element 300 has the second sealing surface 380. The first sealing surface 370 and/or the second sealing surface 380 are oriented crosswise, especially perpendicular, to the axis 350. In certain cases, the first sealing surface 370 and/or the second sealing surface 380 are then subjected to a force in the direction of the axis 350 when the device 310 is in the fastened state, so that a recess in which the device 310 is fastened is sealed vis-à-vis the outside environment. Moreover, the sealing element 390 has a third sealing surface 375 that is oriented lengthwise, especially parallel, with respect to the axis 350. The third sealing surface 375 is arranged across from the shaft 340 and at a distance from the shaft 340. In other embodiments, the third sealing surface touches the shaft when the fastening device is in the unfastened state.

The head 320 has an encircling projection 325 that has a smaller outer diameter than the sealing element 390 and the covering element 300. The covering element 300 has the same outer diameter as the sealing element 390 does. In other embodiments, the outer diameter of the sealing element is smaller than the outer diameter of the covering element and/or of the projection or of the head.

The force-transmission means 345 is positioned at a distance from the sealing means 360 and especially from the first sealing surface 370 in the axial direction, namely, in the direction facing away from the head 320. In other embodiments, the force-transmission means extends in the axial direction to the sealing means or to the first sealing surface, or else all the way to the head.

The device 310' shown in the right-hand half of the drawing of FIG. 3 has a head 320' with a counter-bearing 330' configured as a contact surface for purposes of supporting the first object as well as an elongated shaft 340'. The head 320' is arranged at a first end of the shaft 340', whereby the shaft 340' has a tip at its second end. The lengthwise direction of the shaft defines an axis 350' that is oriented preferably perpendicular to the counter-bearing 330'. Moreover, the shaft 340' has a force-transmission means 345' configured as a thread for purposes of transmitting a holding force from the device 310' to the second object. Preferably, the device 310' is configured as a self-penetrating rotary fastening element. Preferably, the head 320' and/or the shaft 340' are made of a metal, especially aluminum, or of an alloy, particularly high-grade steel or steel, preferably having an anticorrosion coating that especially contains zinc.

The device 310' has a sealing means 360' having a first sealing surface 370' to create a seal vis-à-vis the first object, and a second sealing surface 280' to create a seal vis-à-vis the counter-bearing 330'. The sealing means 360' here comprises a sealing element 390' and a covering element 300' arranged in the axial direction between the sealing element 390' and the head 320'. The sealing element 390' and the covering element 300' have a preferably circular inner and outer contour, and they surround the shaft 340' like a ring. The sealing element 300' is made of a metal, especially aluminum, or of an alloy, particularly high-grade steel or steel, preferably having an anticorrosion coating that especially contains zinc. The covering element 300' here is preferably made of the same material as the head 320' and/or the shaft 340'.

The sealing element 390' is made of a first material. The first material is preferably an elastomer, especially preferably an EPDM. The covering element 300' is made of a second material that differs from the first material. Preferably, the second material comprises or consists of a metal and/or of an alloy such as, for example, high-grade steel. The sealing element 390' and the covering element 300' are arranged across from each other and they touch each other. Preferably, the materials of the sealing element 390' and of the covering element 300' are integrally bonded to each other, especially they are glued or welded together. In other embodiments, the sealing element and the covering element are only loosely in contact with each other.

The counter-bearing 330' has a contact surface 332' for making contact with the covering element 300' as well as a sealing projection 334'. In order to make contact with the sealing element 390', the sealing projection 334' extends to the sealing element 390' in the axial direction relative to the axis 350', and it is arranged directly across from the second sealing surface 380'. Preferably, the sealing projection 334' touches the second sealing surface 380'. The sealing projection 334' preferably extends in the circumferential direction around the axis 350' and surrounds the axis 350' preferably as a closed ring, especially in the form of an annular bead. Preferably, the outer diameter of the sealing projection 334' is exactly the same size as the inner diameter of the covering element 300'. In certain cases, the sealing projection 334' serves to guide, especially to center, the covering element 300'. In other embodiments, in contrast, several sealing projections are only formed in places. In other embodiments, the sealing element, in addition to or as an alternative to the sealing projection of the counter-bearing, has one or more sealing projections that extend in the axial direction to the counter-bearing, especially to its sealing projection.

The sealing element 390' has the first sealing surface 370' as well as the second sealing surface 380'. The first sealing surface 370' and/or the second sealing surface 380' are oriented crosswise, especially perpendicular, to the axis 350'. In certain cases, the first sealing surface 370' and/or the second sealing surface 380' are then subjected to a force in the direction of the axis 350' when the device 310' is in the fastened state, so that a recess in which the device 310' is fastened is sealed vis-à-vis the outside environment. Moreover, the sealing element 390' has a third sealing surface 375' that is oriented lengthwise, especially parallel, with respect to the axis 350'. The third sealing surface 375' is arranged across from the shaft 340' and at a distance from the shaft 340'. In other embodiments, the third sealing surface touches the shaft when the fastening device is in the unfastened state.

The head 320' has an encircling projection 325' that has a smaller outer diameter than the sealing element 390' and the covering element 300' do. The covering element 300' has a larger outer diameter than the sealing element 390' does. In certain cases, the covering element 300' protects the sealing element 390' against external influences such as, for instance, the effects of light or the weather. In other embodiments, the outer diameter of the sealing element is the same as or larger than the outer diameter of the covering element and/or of the projection or of the head.

The force-transmission means 345' is positioned at a distance from the sealing means 360' and especially from the first sealing surface 370' in the axial direction, namely, in the direction facing away from the head 320'. In other embodiments, the force-transmission means extends in the axial direction to the sealing means or to the first sealing surface, or else all the way to the head.

Figure 4:
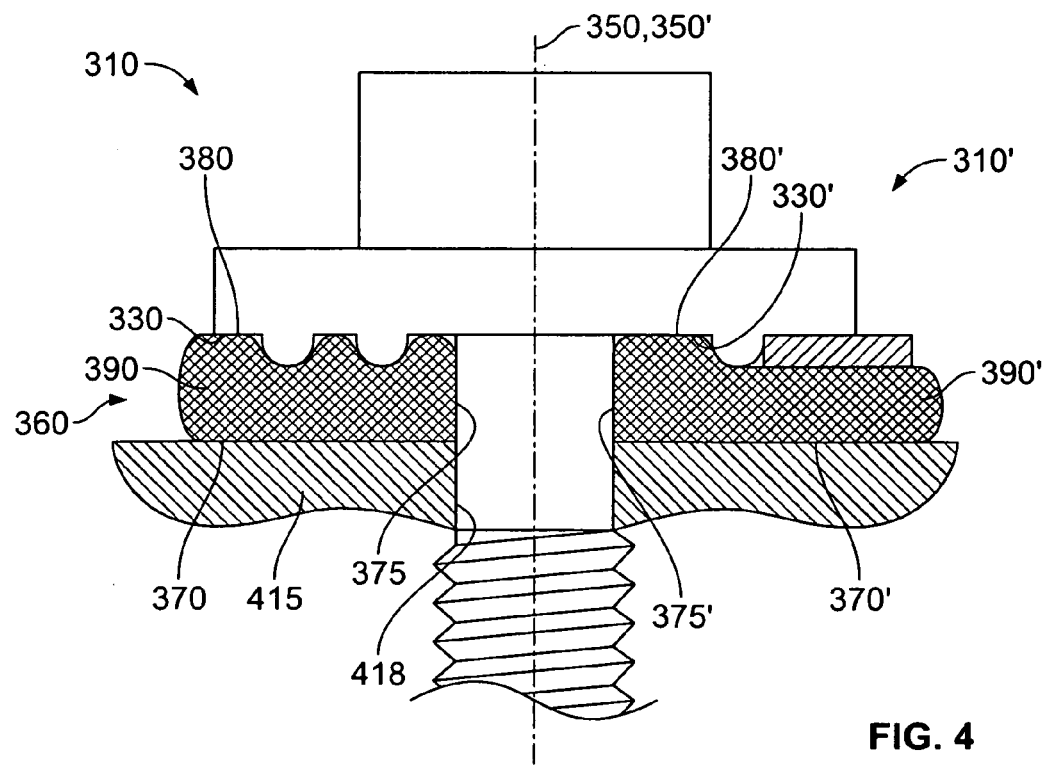
FIG. 4—a combined side and sectional view of a fastening device in several variants from FIG. 3 in the fastened state.

FIG. 4 shows the devices 310, 310' from FIG. 3, now fastened to a first object 415, in another combined side and sectional view. The sealing elements 390, 390' are clamped, especially compressed, between the counter-bearings 330, 330' and the first object 415. With their axial sealing surfaces 370, 370', 380, 380', the sealing means 360, 360' seal a recess 418 in the first object 415 vis-à-vis the outside environment, so that the recess 418 is protected against corrosion.

The sealing projections 334, 336, 334' bring about an increased compression of the sealing elements 390, 390' and, in certain cases, reduce the risk of leaks. Moreover, the third sealing surfaces 375, 375' are pressed against the shafts 340, 340', so that the risk of leaks is further reduced in certain cases. If forces occur between the counter-bearings 330, 330' and the sealing elements 390, 390' perpendicular to the axes 350, 350', then the sealing projections 334, 336, 334' likewise diminish the risk of slippage of the sealing elements 390, 390' in certain cases.

Figure 5:
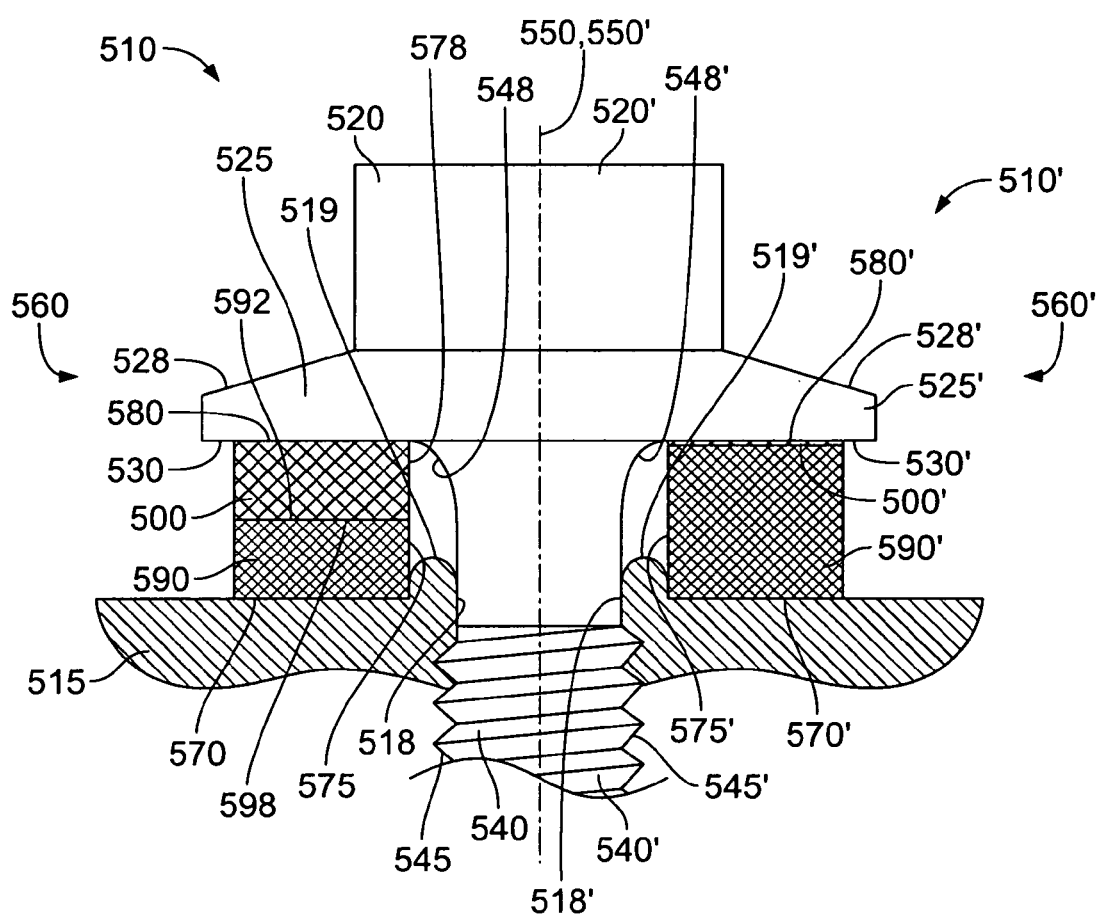
FIG. 5—a combined side and sectional view of a fastening device in several variants in the fastened state.

FIG. 5 shows in the left-hand half of the drawing a device 510 as well as a modified device 510' in the right-hand half of the drawing, each meant for fastening a first object 515 to a second object, in a combined side and sectional view.

The device 510 shown in the left-hand half of the drawing of FIG. 5 has a head 520 with a counter-bearing 530 configured as a contact surface for purposes of supporting the first object as well as an elongated shaft 540. The head 520 is arranged at a first end of the shaft 540, whereby the shaft 540 has a tip at its second end. The lengthwise direction of the shaft defines 540 defines an axis 550 that is oriented preferably perpendicular to the counter-bearing 530. Moreover, the shaft 540 has a force-transmission means 545 configured as a thread for purposes of transmitting a holding force from the device 510 to the second object. The head 520 and/or the shaft 540 are made of a metal, especially aluminum, or of an alloy, particularly high-grade steel or steel, preferably having an anticorrosion coating that especially contains zinc.

The device 510 has a sealing means 560 having a first sealing surface 570 to create a seal vis-à-vis the first object, and a second sealing surface 580 to create a seal vis-à-vis the counter-bearing 530. Particularly in order to create a seal vis-à-vis the counter-bearing 530, the second sealing surface 580 is arranged directly across from the counter-bearing 530 and it touches the counter-bearing 530. The sealing means 560 here comprises a sealing element 590 and a covering element 500 arranged in the axial direction between the sealing element 590 and the head 520. The sealing element 590 and the covering element 500 have a preferably circular inner and outer contour, and they surround the shaft 540 like a ring. The thickness of the sealing element 590 in the axial direction relative to axis 550 is preferably at least 3 mm.

The sealing element 590 has a third sealing surface 592 to create a seal vis-à-vis the covering element 500, while the covering element 500 has a fourth sealing surface 598 to create a seal vis-à-vis the sealing element 590. The third sealing surface 592 and the fourth sealing surface 598 are arranged across from each other and they touch each other. Preferably, the materials of the third sealing surface 592 and of the fourth sealing surface 598 are integrally bonded to each other, especially they are glued or welded together. In other embodiments, the third sealing surface and the fourth sealing surface are only loosely in contact with each other.

Moreover, the sealing element 590 has an inner surface 575 that is oriented lengthwise, especially parallel, with respect to the axis 550. By the same token, the covering element 500 has an inner surface 578 that is oriented lengthwise, especially parallel, with respect to the axis 550. The inner surface 575, 578 are arranged across from the shaft 540 and at a distance from the shaft 540. Optionally, a gap between the inner surface 575 and the shaft 540, and/or between the inner surface 578 and the shaft 540, serves to accommodate a bead 519 of the first object 515, said bead 519 especially surrounding the axis 550 and being formed in certain cases during the insertion of the preferably self-penetrating device 510 into a recess 518 of the first object 515. Furthermore, the gap between the inner surface 578 and the shaft 540 and/or between the inner surface 575 and the shaft 540 allows the provision of a rounded-off transition area 548 between the shaft 540 and the head 520. The transition area 548 here preferably has two, three or more conical sections with angles of inclination relative to the axis 550 that increase towards the head 520.

In other embodiments, the sealing element and/or the covering element extend to the shaft when the device is in the fastened and/or already in the unfastened state. In certain cases, the volume between the transition area and the bead is filled up by the sealing element and/or by the covering element, so that this optionally brings about an additional sealing effect.

The sealing element 590, which especially comprises the first sealing surface 570, is made of a first material. The covering element 500, which especially comprises the second sealing surface 580, is made of a second material that differs from the first material. The first material is preferably a first elastomer, especially preferably a first EPDM, and/or the second material is preferably a second elastomer, especially preferably a second EPDM. The Shore hardness of the first material here is 70° Shore at the maximum, preferably 60° Shore at the maximum, especially preferably 50° Shore at the maximum. The Shore hardness of the second material here is at least 70° Shore, preferably at least 80° Shore, especially preferably at least 90° Shore.

The head 520 has a disk-shaped, encircling projection 525 that has a outer larger diameter than the sealing element 590 and the covering element 500. Preferably, the outer diameter of the projection 525 is between 9 mm and 20 mm. The sealing element 590 has the same diameter as the covering element 500 does. Moreover, the sealing element 590 has the same inner diameter as the covering element 500 does. The projection 525 has a bevel 528 on its side facing away from the shaft 540.

The force-transmission means 545 is positioned at a distance from the sealing means 560 and especially from the first sealing surface 570 in the axial direction, namely, in the direction facing away from the head 520. The axial distance of the force-transmission means 545 from the head 520 or from the projection 525 is preferably between 2 mm and 15 mm, especially preferably between 3 mm and 10 mm. The thread of the force-transmission means 545 here ends abruptly at that specific distance from the head. In other embodiments, in contrast, the force-transmission means ends gradually, in particular, the thread height decreases over several millimeters as seen in the axial direction.

The device 510' shown in the right-hand half of the drawing of FIG. 5 has a head 520' with a counter-bearing 530' configured as a contact surface for purposes of supporting the first object as well as an elongated shaft 540'. The head 520' is arranged at a first end of the shaft 540', whereby the shaft 540' has a tip at its second end. The lengthwise direction of the shaft defines an axis 550' that is oriented preferably perpendicular to the counter-bearing 530'. Moreover, the shaft 540' has a force-transmission means 545' configured as a thread for purposes of transmitting a holding force from the device 510' to the second object.

The device 510' has a sealing means 560' having a first sealing surface 570' to create a seal vis-à-vis the first object, and a second sealing surface 580' to create a seal vis-à-vis the counter-bearing 530'. Especially to create a seal vis-à-vis the counter-bearing 530', the second sealing surface 580' is arranged directly across from the counter-bearing 530' and it touches the counter-bearing 530'. Particularly in order to create a seal vis-à-vis the counter-bearing 530, the second sealing surface 580 is arranged directly across from the counter-bearing 530 and it touches the counter-bearing 530. The sealing means 560' here comprises a sealing element 590' and a covering element 500' arranged in the axial direction between the sealing element 590' and the head 520'. The sealing element 590' and the covering element 500' have a preferably circular inner and outer contour, and they surround the shaft 540' like a ring. The thickness of the sealing element 590' in the axial direction relative to axis 550' is preferably at least 3 mm.

Moreover, the sealing element 590' has an inner surface 575' that is oriented lengthwise, especially parallel, with respect to the axis 550'. The inner surface 575' is arranged across from the shaft 540' and at a distance from the shaft 540'. Optionally, a gap between the inner surface 575' and the shaft 540' serves to accommodate a bead 519' of the object 515, said bead 519' especially surrounding the axis 550' and being formed in certain cases during the insertion of the preferably self-penetrating device 510' into a recess 518' of the first object 515'. Furthermore, the gap between the inner surface 575' and the shaft 540' allows the provision of a rounded-off transition area 548' between the shaft 540' and the head 520'. The transition area 548' here preferably has two, three or more conical sections with angles of inclination relative to the axis 550' that increase towards the head 520'.

The sealing element 590', which especially comprises the first sealing surface 570', is made of a first material. The first material is preferably an elastomer, especially preferably an EPDM, preferably having a Shore hardness of 70° Shore at the maximum. The covering element 500', which especially comprises the second sealing surface 580', is made of a second material that differs from the first material. Preferably, the second material comprises or consists of a lubricant such as, for example, a wax and/or an oil. In certain cases, the covering element reduces shearing forces that might occur between the covering element 500' and the head 520' when the device 510' is tightened.

The head 520' has a disk-shaped, encircling projection 525' that has a larger outer diameter than the sealing element 590' and the covering element 500' do. In certain cases, the sealing element 590' and the covering element 500' are protected against external weather influences such as, for instance, sunlight. Preferably, the outer diameter of the projection 525' is between 9 mm and 20 mm, especially preferably between 12 mm and 18 mm. The projection 525' has a bevel 528' of its side facing away from the shaft 540'. Moreover, especially on its side facing away from the shaft 540', the head 520' has a turning means, preferably a hexagon socket, a hexagon head, a flat slit, a cross slot or the like.

The force-transmission means 545' is positioned at a distance from the sealing means 560' and especially from the first sealing surface 570' in the axial direction, namely, in the direction facing away from the head 520'. The axial distance of the force-transmission means 545' from the head 520' or from the projection 525' is preferably between 3 mm and 15 mm. The thread of the force-transmission means 545' here ends abruptly at that specific distance to the head. In other embodiments, in contrast, the force-transmission means ends gradually, in particular, the thread height decreases over several millimeters as seen in the axial direction.

The invention was described on the basis of examples of a device, especially to fasten a first object to a second object so as to create a seal. The first object is preferably a plate-shaped object such as, for instance, a metal sheet. The second object is preferably likewise a plate-shaped object such as, for example, a metal sheet or a solid object having a thickness that is greater than the length of the shaft of the device.

The features of the described embodiments can be combined with each other as desired within a single fastening device. It is hereby pointed out that the device according to the invention is also suitable for other purposes.

What is claimed is:

1. A device for fastening a first object to a second object, comprising:
    a head having a counter-bearing to support the first object;
    an elongated shaft having a lengthwise direction of the shaft defining an axis; and
    a seal, the seal having a first sealing surface to create a first seal with respect to the first object, the seal having a sealing element and a cover element arranged in the lengthwise direction between the sealing element and the head, the sealing element being made of a first material and the cover element being made of a second material differing from the first material, wherein the counter-bearing has a contact surface for the cover element and a projection surrounding the axis, the sealing element having a second sealing surface opposite the first sealing surface for contacting the counter-bearing to create a second seal, the cover element contacting the counter-bearing and the sealing element, the second sealing surface also contacting the projection.

2. The device as recited in claim 1 wherein the sealing element contacts a tip of the projection.

3. The device as recited in claim 1 wherein the cover element located radially outwardly of the projection, and a space between the projection and the shaft is fillable with the sealing element to create the second seal.

4. The device as recited in claim 1 wherein the sealing element is spaced from the counter-bearing radially inwardly of the projection in an uninstalled state.

5. The device as recited in claim 4 wherein the sealing element is spaced from the shaft in the uninstalled state.

6. The device as recited in claim 4 wherein the sealing element contacts the counter-bearing and the first object in an installed state.

7. The device as recited in claim 6 wherein the sealing element contacts the shaft in the installed state.

* * * * *